UNITED STATES PATENT OFFICE 2,278,171

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application January 25, 1941, Serial No. 375,981

8 Claims. (Cl. 252—339)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines.. Controlled emulsification and subsequent demulsification under the conditions just mentioned is of significant value in removing impurities, particularly inorganic salts, from pipeline oil.

The chemical compound or composition of matter herein described that is employed as the demulsifier of our process, is a new material representing phosphorated derivatives which may be in the form of an ester, a salt, or an acid, but preferably, in one of the two last mentioned forms, and especially the salt form. If a high molal sulfonic acid be indicated by the conventional formula:

$$R.SO_3H$$

then a hydroxylated ester which may actually have more than one hydroxyl group in the radical which replaces the sulfonic acid hydrogen atom, may be indicated by the following formula:

$$R.SO_3TOH$$

If such ester, for instance, the ester derived from ethylene glycol, is treated with phosphoric acid, one then can obtain a phosphate of the sulfonic acid ester, as indicated in the following manner:

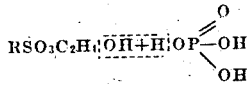

The neutralization product derived therefrom by the use of ammonium hydroxide, for example, may be indicated by the following formula:

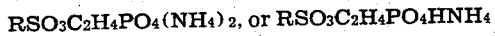

A material of the kind above described illustrates the compounds herein contemplated with certain added provisos:

(a) That the sulfonic acid in the form of a salt or acid, be surface-active, as subsequently defined; and (b) That the ester derived therefrom, prior to phosphoration, i. e., conversion into a phosphorated derivative, be water-insoluble.

As has been indicated, the compounds herein contemplated are derivatives of surface-active sulfonic acids, which, generally speaking, are water-soluble, but in some instances, such as in the case of petroleum mahogany acids, may be essentially oil-soluble, although such oil-soluble acids may also show water solubility to a greater or lesser degree, particularly in the form of sodium, potassium, or ammonium salts. Such sulfonic acids having a molecular weight range between 200 and 1,000, and are characterized by the fact that their alkali metal salts are surface-active. By "surface-active" we mean that a relatively dilute solution of alkali metal salts, for instance, the sodium or potassium salt, and also ammonium salt, in a solution containing a few tenths of a percent or thereabouts, will show a marked lowering of the static surface tension, in comparison with distilled water. Where the sulfonic acids or their salts are oil-soluble, surface-activity may be indicated by the ability or characteristic property of producing water-in-oil emulsions, and sometimes by the ability to cause oily vehicles to foam or froth. Usually, the acids themselves show the same surface-active property as the salts.

Although the types of compounds employed as the demulsifier in the present process are new chemical products, certain of the raw materials used in the manufacture of said chemical products, to wit, surface-active sulfonic acids having a molecular weight of between 200 and 1,000, are well known compositions of matter. However, as they may be derived in a variety of ways and may show a difference in degree, reference is herein made to suitable means for obtaining surface-active sulfonic acids having a molecular weight of between 200 to 1,000, particularly adapted as raw materials in the manufacture of compounds of the kind herein contemplated.

More specifically, in the manufacture of compounds of the kind herein contemplated, one may employ as raw materials petroleum sulfonic acids, fatty sulfonic acids, fatty aromatic sulfonic acids, alkylated monocarbocyclic sulfonic acids, alkylated non-hydrogenated dicarbocyclic sulfonic acids, partially or completely hydrogenated alkylated dicarbocyclic sulfonic acids, alkylated polycarbocyclic sulfonic acids containing at least three nuclei, cyclo-alkylated carbocyclic sulfonic acids free of alkyl radicals, and aralkylated carbocyclic sulfonic acids free of alkyl radicals. In some instances the actual manufacture involves the formation of a salt of a sulfonic acid, rather than a sulfonic acid, as, for example, where sodium bisulfite or sodium sulfite is used as a sulfonating agent. In such instances the sulfonic acid can generally be obtained by some conventional procedure, as, for example, dissolving the sodium sulfonic acid salt in any suitable low molal alcohol, passing in hydrochloric acid gas with the precipitation of sodium chloride, and the liberation of a sulfonic acid which is usually soluble in the alcoholic medium. The alcoholic solution of the sulfonic acid can be separated from the inorganic salt by filtration, and then the sulfonic acid can be recovered by distillation of the alcoholic solvent.

The sulfonic acids derived from petroleum constitute an important group of acids which may be used as raw materials for the manufacture of compounds or demulsifiers of the type contemplated by our invention. Petroleum sulfonic acids, regardless of whether derived as the principal product of reaction or as the by-product, can be divided into two general types, to wit, green acid or acids, and mahogany acid or acids. The green acids are characterized by being water-soluble or dispersible. Illustrating this type of petroleum acid, reference is made to the following patents, to wit:

U. S. Patent No. 1,395,195, dated Jan. 24, 1933, Limburg; U. S. Patent No. 1,836,429, dated Dec. 15, 1931, Baddiley et al.; U. S. Patent No. 1,955,859, dated Apr. 24, 1934, Osburn et al.; U. S. Patent No. 1,836,428, dated Dec. 15, 1931, Baddiley et al.; U. S. Patent No. 1,836,429, dated Dec. 15, 1931, Baddiley et al.; U. S. Patent No. 1,836,430, dated Dec. 15, 1931, Baddiley et al.; U. S. Patent No. 1,836,431, dated Dec. 15, 1931, Baddiley et al.; U. S. Patent No. 1,766,063, dated June 24, 1930, De Groote et al.; U. S. Patent No. 1,909,295, dated May 16, 1933, Luther et al.; U. S. Patent No. 2,042,410, dated May 6, 1936, Pierce; and German Patent No. 550,242, dated May 19, 1932, Chemische Fabrik Pott & Company.

Water-soluble salts of true sulfo-naphthenic acids, i. e., chemical compounds containing a naphthene nucleus, a sulfonic group, and a carboxy group, represent a suitable type of a break-inducing agent. Such compounds, of course, must be differentiated from sulfo-naphthenes, i. e., the naphthene type of compound containing a sulfonic acid group, but no carboxyl. See British Patent No. 275,267, dated February 4, 1929, to Chemische Fabrik Milch, A. G.

As to the manufacture of oil-soluble petroleum sulfonic acids, see the following:

U. S. Patent No. 2,115,843, dated May 3, 1938, Dawson; U. S. Patent No. 2,158,680, dated May 16, 1939, Retailliau; U. S. Patent No. 2,166,117, dated July 18, 1939, Blumer; U. S. Patent No. 2,168,315, dated Aug. 8, 1939, Blumer; U. S. Patent No. 2,188,770; dated Jan. 30, 1940, Robertson; U. S. Patent No. 2,201,119, dated May 14, 1940, Blumer et al.; U. S. Patent No. 2,203,441, dated June 4, 1940, Oliver; U. S. Patent No. 2,203,443, dated June 4, 1940, Ross; U. S. Patent No. 2,203,440, dated June 4, 1940, Oliver; and U. S. Patent No. 2,209,445, dated July 30, 1940, de Mering.

The sulfonic acids derived from fatty acids or fatty materials whose water-soluble salts are contemplated in the present invention, are of the kind which have been frequently employed as fat splitters. Their composition and method of making the same are well understood, and they are available from the usual sources. For the manufacture of fatty sulfonic acids, reference is made to the following patents.

U. S. Patent No. 601,603, dated May 29, 1898, Twitchell; U. S. Patent No. 1,931,491, dated Oct. 24, 1933, Hausman; U. S. Patent No. 1,926,715, dated Sept. 12, 1933, De Groote et al.; and U. S. Patent No. 1,988,833, dated Jan. 22, 1935, De Groote et al.

Another type of a suitable fatty sulfonic acid is the type which is characterized by the fact that an aromatic radical is included and that the sulfonic group is directly attached to the aromatic nucleus, instead of being directly attached to the hydrocarbon chain of the fatty acid. This type is commonly referred to as a Twitchell reagent. See U. S. Patent No. 628,503, dated July 11, 1899, to Twitchell.

See also "Arylstearic Acids from Oleic Acid," A. J. Stirton and R. F. Peterson, Industrial and Engineering Chemistry, July, 1939, pp. 856–858, and "Sulfonated Arylstearic Acids," A. J. Stirton, R. F. Peterson and P. H. Groggins, Industrial and Engineering Chemistry, August, 1940, pp. 1136–37.

Another class of suitable sulfonic acids which may be employed as raw materials, include the alkylated aromatic sulfonic acids. Although such acids may be derived from monocyclic aromatic compounds, such as cymene or the like, it is preferable that they be derived from polycyclic aromatic compounds, such as naphthalene, anthracene, diphenyl, etc. Generally speaking, it is usually preferable to use naphthalene for various reasons, but particularly due to its low cost. In regard to the uncondensed polycyclic compounds, it is generally desirable to use diphenyl or hydroxyl diphenyl. Although reference has been made to compounds derived from naphthalene, it is obvious that similar compounds, i. e., alkylated sulfonic acids, can be derived from any other suitable polycyclic material, condensed or uncondensed, or may be derived from a monocyclic material. The production of alkylated naphthalene sulfonic acids is described in U. S. Patent No. 2,076,623, dated April 13, 1937, to De Groote et al.

In some instances compounds of the kind described are manufactured most expediently from olefines or diolefines, as, for instance, the type illustrated in U. S. Patent No. 2,072,153, dated March 2, 1937, to Bruson et al. In some instances it is particularly desirable to introduce an alkyl radical having more than 10 carbon atoms, and possibly as many as 30 carbon atoms. Such materials may be manufactured in the manner described in U. S. Patent No. 2,083,223, dated January 8, 1937, to De Groote, or as described in U. S. Patent No. 2,161,173, dated June 6, 1939, to Kyrides. See also U. S. Patent No. 2,218,472, dated October 15, 1940, to Kyrides.

For the manufacture of sulfonated alkylated diphenyl compounds, reference is made to U. S. Patent No. 1,901,507, dated March 14, 1933, to Guenther, and U. S. Patent No. 2,135,978, dated November 8, 1938, to Magoun.

As to similar materials having an alicyclic nucleus, and more particularly, an aromatic nucleus, reference is made to the aforementioned Guenther U. S. Patent No. 1,901,507. Similarly, mono-, di-, or triamylated naphthalene, which is an article of commerce, may be hydrogenated and subjected to sulfonation. Another commercially available compound, which is suitable for use is retene sulfonic acid or its sodium salt.

In the manufacture of compounds of the kind previously described, it is not necessary to employ alkyl alcohols, but if desired, alicyclic alcohols, such as cyclohexanol or an aralkyl alcohol, such as benzyl alcohol, may be employed, or the equivalent of cyclohexanol, to wit, a cyclic olefine may be employed. Obviously, if an aralkyl alcohol is employed, for instance, benzyl alcohol and benzene or naphthalene, one obtains in essence a diaryl methane; and it is intended to include in the description of our invention, the use of sulfonated diaryl methanes and their various homologues in the present invention. This type of material is also obtainable in other ways, for instance, condensation of two nuclei by introduction of the methylene bridge or substituted methylene bridge derived from formaldehyde or acetone or similar compounds. In this connection reference is made to U. S. Patent No. 1,336,759, dated April 13, 1920, to Schmidt, and to British Patent No. 467,998, dated December 28, 1935, to Carpmael.

It is well known that sulfonic acids are readily obtained from tallol, rosin, rosin derivatives, and the like. In many instances, the same procedure can be applied as is used in the manufacture of sulfonic acids from fatty acids. As to the nature of tallol, which is now available commercially in both the crude and refined types, see Ellis, Chemistry of Synthetic Resins, 1935, Volume 1, page 754-755. See also U. S. Patent No. 1,961,963, dated June 5, 1934, to De Groote et al.; U. S. Patent No. 1,913,538, dated June 13, 1933, to De Groote et al.; and U. S. Patent No. 1,910,680, dated May 23, 1933, to De Groote et al. See especially, U. S. Patent No. 2,220,678, dated November 5, 1940, to Cromwell & Merley.

As to certain sulfonic acids containing amino or amido linkages, see the following U. S. Patents to Guenther et al., to wit, No. 1,932,176, dated October 24, 1933 and Nos. 1,932,180, 1,932,178 and 1,932,177, all dated October 24, 1933.

As to aromatic alkylene ether sulfonates and similar types, see the following: U. S. Patent No. 2,178,831 and 2,178,832, both dated November 7, 1939, to Bruson; U. S. Patent No. 2,178,829, dated November 7, 1939, to Bruson et al.; and U. S. Patent No. 2,184,935, dated December 26, 1939, to Bruson et al.

As to sulfo-dicarboxylic acids which are surface-active, if at least one carboxylic hydrogen atom has been replaced by a hydrophobe group having at least 8 carbon atoms, such as an octyl group or the like, see U. S. Patent No. 2,028,091, dated January 14, 1936; to Jaeger; and U. S. Patent No. 2,176,423, dated October 17, 1939, to Jaeger.

As to patents illustrating other suitable high molal sulfonic acids, which may be employed as raw materials, see the following patents:

U. S. Patent No. 1,966,187, dated March 8, 1938, to De Groote; U. S. Patent No. 1.181,172, dated Oct. 4, 1932, to Daimler et al.; U. S. Patent No. 1,916,776, dated July 4, 1938, to Steindorff et al; U. S. Patent No. 2,106,242, dated Jan. 25, 1938, to De Groote et al.; U. S. Patent No. 2,106,243, dated Jan. 25, 1938, to De Groote et al.; and U. S. Patent No. 2,110,847, dated Mar. 8, 1938, to De Groote.

High molal alcohols, for instance, naphthyl alcohol, can be treated so as to yield a sulfonic acid. Such high molal alcohol sulfonic acid may be employed as a raw material. See U. S. Patent No. 2,000,994, dated May 14, 1935, to Schrauth. See also the following:

U. S. Patent No. 2,061,617, dated Nov. 24, 1936, to Downing et al.; U. S. Patent No. 2,061,618, dated Nov. 24, 1936, to Downing et al.; U. S. Patent No. 2,061,619, dated Nov. 24, 1936, to Downing et al.; U. S. Patent No. 2,061,620, dated Nov. 24, 1936, to Downing et al.; U. S. Patent No. 2,171,117, dated Aug. 29, 1939, to Schrauth et al.; U. S. Patent No. 2,187,338, dated Jan. 16, 1940, to Werntz; U. S. Patent No. 2,187,339, dated Jan. 16, 1940, to Werntz; U. S. Patent No. 1,917,255, dated July 11, 1933, to Harris; U. S. Patent No. 2,170,380, dated Aug. 22, 1939, to Holsten; and U. S. Patent No. 1,966,187, dated July 10, 1934, to Schirm.

The method of manufacturing hydroxylated esters of sulfonic acids is well known, although direct reaction between the sulfonic acid and a polyhydric alcohol, such as ethylene glycol, is not applicable, for the reason that one obtains little or no yield of the hydroxylated ester. One procedure contemplates the conversion of sulfonic acid into the sulfonchloride, and subsequently reacting the sulfonchloride with a polyhydric alcohol, with the liberation of hydrochloric acid. Another procedure involves reaction between the sulfonic acid, or preferably a salt, such as the sodium salt, and the chlorhydrin, such as ethylene glycol chlorhydrin. Still another procedure for the manufacture of such hydroxylated sulfonic acid esters has been illustrated in some of the patents previously referred to, and particularly, the aforementioned De Groote et al. U. S. Patent No. 2,106,242, dated January 25, 1938. See last three formulas on page 3 of said De Groote et al. patent.

In connection with materials of the kind typified by these formulas, it is desirable to employ a substituted methyl chloride. For instance, one can obtain diamylated naphthalene, triamylated naphthalene, mono-octylated naphthalene, or the like. Such materials can be converted into the substituted naphthyl metachloride by the procedure indicated in U. S. Patent No. 2,166,554, dated July 18, 1939, to Roblin.

The preferred way of preparing such materials is to use the procedure described in U. S. Patent No. 2,208,581, dated July 23, 1940, to Hoeffelmann. Briefly stated, the procedure employed is to obtain the free sulfonic acid in an anhydrous state and treat with a compound containing an olefine oxide radical. As typical examples of applicable compounds, may be mentioned glycerine epichlorhydrin, glycide alcohol, ethylene oxide, propylene oxide, butene-2-oxide, butene-1-oxide, isobutylene oxide, butadiene oxide, butadiene dioxide, chloro-prene oxide, isoprene oxide, decene oxide, styrene oxide, cyclohexylene oxide, cyclopentene oxide, etc.

Note, however, that there are certain differences between the procedure employed for the manufacture of the intermediate raw material of the procedure, as employed in said aforementioned Hoeffelmann patent. The Hoeffelmann method contemplates treatment of sulfonic acids, which are not necessarily surface-active, for instance, benzene sulfonic acid, with an olefine oxide, so as to produce materials which are, for the main part, water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent sulfation step. There is no objection to the presence of a recurring ether linkage, provided that the ester is still water-insoluble. This may be illustrated in the following manner, using ethylene oxide as the reactant:

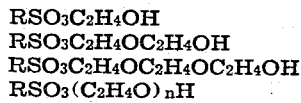

One is interested primarily in obtaining a material of the following type:

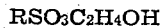

But materials illustrated by any of the three subsequent types:

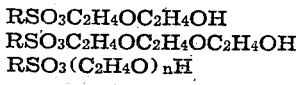

are just as satisfactory, provided that the ester, prior to sulfation, is water-insoluble. In some instances, the presence of the recurring ether linkage may give some added desirable characteristic. Ordinarily speaking, one is concerned only with minimum reactant cost; and thus, the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid may be considered as an upper limit, but obviously, solubility is influenced by the alkylene oxide employed. Butylene oxide naturally will not cause a sulfonic acid to be converted into a water-soluble ester as readily as ethylene oxide.

Thus, having obtained hydroxylated water-insoluble esters—and they may be polyhydroxylated and may or may not contain the recurring ether linkage—the next step is to submit them to a conventional phosphoration process. The phosphoration of such materials is the conventional procedure employed for introducing a phosphate radical into various materials containing an esterifiable hydroxy group. The reactants employed generally include phosphorus pentoxide, pyrophosphoric acid, metaphosphoric acid, phosphorus halides, ethyl metaphosphate, phosphorus trioxide, phosphorus pentachloride, phosphorus oxychloride, or some other reagents capable of furnishing the elements required for the formation of a phosphoric acid. A condensing agent may sometimes be employed, or a solvent may be employed. Sometimes the use of both a solvent and condensing agent is desirable.

Recently there has become available a material known as tetraphosphoric acid, whose formula corresponds to $H_6P_4O_{13}$. The material is known also as phospholeum, and bears a relationship to orthophosphoric acid comparable to that between oleum and monohydrate or sulfuric acid. Such material may be used as a phosphorating agent in the same manner that oleum is used as a sulfonating agent. If employed in an amount equivalent to 150–200% of the theoretical proportions, tetraphosphoric acid often gives excellent water-soluble phosphorated products. If water solubility is not obtained, small amounts of phosphorus pentoxide, for instance, 25–40% of theoretical proportions, can be added cautiously to the reaction mass, so as to increase the activity of the phosphorating agent. Increased temperature may also be employed.

Dilution with water allows the separation of the phosphorated mass, and the waste phosphoric acid is drawn off in a manner comparable to a sulfation or sulfonation process. Similarly, when phosphoration is conducted in the presence of inert solvents, such as carbon tetrachloride or benzene, such solvents can be removed by vacuum distillation, or by any suitable procedure.

The phosphorated mass may be employed as such, or may be neutralized in any convenient manner with any one of the conventional basic materials frequently employed, such as caustic soda, caustic potash, ammonia, various hydroxylated amines, including monoethanolamine, diethanolamine, triethanolamine; and non-hydroxylated amines, including amylamine, benzylamine, cyclohexanolamine, and the like. Such materials may be neutralized with polyvalent compounds, such as calcium oxide, magnesium oxide, polyamines, including ethylene diamine, diethylene triamine, triethylene tetramine, etc.

As to phosphoration processes generally which are applicable to materials having an esterifiable hydroxy group—and such broad class, of course, includes the hydroxylated esters of sulfonic acids as herein contemplated as reactants—reference is made to the following patents:

U. S. Patent No. 1,900,973, dated Mar. 14, 1933, to Bertsch; U. S. Patent No. 2,026,785, dated Jan. 7, 1936, to Harris; U. S. Patent No. 2,052,029, dated Aug. 25, 1936, to Harris; U. S. Patent No. 2,121,611, dated June 21, 1938, to Salsberg; U. S. Patent No. 2,177,650, dated Oct. 31, 1939, to Harris; U. S. Patent No. 2,177,757, dated Oct. 31, 1939, to Vanderbilt; U. S. Patent No. 2,190,769, dated Feb. 20, 1940, to Butz; U. S. Patent No. 2,177,983, dated Oct. 31, 1939, to Harris; U. S. Patent No. 2,177,984, dated Oct. 31, 1939, to Harris; British Patent No. 281,232, dated Oct. 7, 1927; British Patent No. 452,508, dated Jan. 23, 1935; and German Patent No. 240,075, dated Oct. 28, 1911.

It is to be particularly noted that the procedure herein contemplated is especially valuable in producing desirable materials from comparatively inexpensive sulfonic acids, i. e., sulfonic acids of the type exemplified, water-soluble petroleum sulfonic acids, oil-soluble petroleum sulfonic acids, alkylaryl sulfonic acids derived, for example, from naphthalene and isopropyl alcohol, Twitchell type acids, i. e., sulfo-aromatic fatty acids, and low-priced sulfonic acids derived from rosin, modified rosin, and tallol, with or without the addition of aromatic materials.

HYDROXYLATED SULFONIC ACID ESTERS

*Example 1*

A mahogany sulfonate obtained from the manufacture of white oil from Pennsylvania grade of crude petroleum is treated in the manner described in the aforementioned Kessler and Salzmann Patent No. 2,125,300. The material, so obtained, may contain moisture in varying amounts from a few tenths of a percent, to an appreciable amount. If the amount of moisture present represents more than two or three percent, or even in such instances where this relatively small percentage is present, it is preferably converted to the anhydrous state by admixture with xylene or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained, in the presence or absence of a selected inert solvent, is reacted with one to three moles of ethylene oxide in the manner described in the aforementioned Hoeffelman Patent No. 2,208,581, so as to yield a water-insoluble ester.

HYDROXYLATED SULFONIC ACID ESTERS

*Example 2*

Green acids are obtained from a Gulf Coast lubricating oil distillate having an S. U. viscosity at 100° F. of about 400 seconds. The procedure empoyed is that described in the aforementioned Robertson Patent No. 2,188,770. The material, so obtained, contains considerable moisture and must be dehydrated by any conventional procedure, such as a vacuum drier, or by means of xylene, or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained, in the presence or absence of a selected inert solvent, is reacted with one to three moles of ethylene oxide in the manner described in the aforementioned Hoeffelman Patent No. 2,208,581, so as to yield a water-insoluble ester.

HYDROXYLATED SULFONIC ACID ESTERS

*Example 3*

Dipropyl naphthalene mono-sulfonic acid is obtained in the anhydrous state by passing dry carbon dioxide gas through the same at a temperature sufficient to insure its fluidity. The dried material is admixed with about 50% by weight of xylene and is treated with one to three moles of ethylene oxide in the manner described in the aforementioned Hoeffelman Patent No. 2,208,581, so as to yield a water-insoluble ester. The xylene can then be removed by distillation. Esterification can be conducted in the absence of xylene, if desired.

HYDROXYLATED SULFONIC ACID ESTERS

*Example 4*

The sulfonic acid derivative of stearic acid is produced according to Example 1 of aforementioned Gunther and Hetzer Patent No. 1,926,442. The sulfostearic acid, so obtained, is converted into the anhydrous state by any suitable procedure. It may be heated to approximately 110 to 120° C., and dried carbon dioxide gas passed through until the material is anhydrous. It may be dried in a vacuum drier, so as to yield an anhydrous material. It may be distilled in the presence of an insoluble solid such as xylene, so that the xylene is permitted to carry off water during the distillation. Vapors, so obtained, are condensed and the water separated from the xylene. The xylene can be returned for re-circulation so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl stearate sulfonic acid, so obtained, is treated with one to three moles of ethylene oxide in the manner described in the aforementioned Hoeffelman patent No. 2,208,581, so as to yield a water-insoluble ester.

HYDROXYLATED SULFONIC ACID ESTERS

*Example 5*

The sulfo-aromatic fatty acid is produced from oleic acid and benzol in the manner described in the aforementioned U. S. Patent No. 1,416,284. The sulfonated mass obtained in the customary manner is diluted and boiled or steamed in the presence of excess sulfuric acid until any fatty acid sulfates comparable to oleic acid hydrogen sulfate has been decomposed. After such decomposition of such organic acid sulfates, separation is permitted and the waste acid withdrawn. The mass, so obtained, is neutralized to the methyl orange indicator endpoint, so as to neutralize all sulfonic acid radicals present. The material then is dissolved in several times its volume of water and extracted with a suitable solvent, such as petroleum ether, benzol, or the like, so as to remove unsulfated fatty material. The dilute solution of the sulfo-aromatic material, so obtained, is converted into the anhydrous state by any suitable procedure. It may be heated to approximately 110 to 120° C., and dried carbon dioxide gas passed through until the material is anhydrous. It may be dried in a vacuum drier, so as to yield an anhydrous material. It may be distilled in the presence of an insoluble solvent, such as xylene, so that the xylene is permitted to carry off water during distillation. Vapors, so obtained, are condensed and the water separated from the xylene. The xylene can be returned for re-circulation to carry off more water. In any event the anhydrous material having been obtained in any suitable manner is dissolved in any suitable low molal alcohol, such as ethyl alcohol. The alcoholic solution, substantially water-free, is treated with hydrochloric acid gas, so as to precipitate sodium chloride and liberate an alcoholic solution of the sulfo-aromatic fatty acid. The salt formed is separated and the alcoholic solution refluxed until the sulfo-aromatic material is converted into the corresponding ethyl ester by replacement of the carboxylic hydrogen atom by an ethyl group. One pound mole of the anhydrous sulfo-phenol stearic acid ethyl ester is treated with one to three moles of etylene oxide in the manner described in the aforementioned Hoeffelman patent No. 2,208,581, so as to yield a water-insoluble ester.

HYDROXYLATED SULFONIC ACID ESTERS

Example 6

Tallol is converted into the hydroxy ethyl ester in the manner described in Example 4 of the aforementioned British Patent No. 340,272. The hydroxy ethyl ester is then esterified in equal molal proportions with chloroacetic acid. The product, so obtained, is treated in the conventional manner with one mole of sodium sulfite with the elimination of sodium chloride. The sodium sulfonate, so obtained, is dissolved in alcohol and the free sulfonic acid liberated in the manner previously suggested. The sulfonic acid, so obtained, is anhydrous or can be converted into the anhydrous state by any suitable procedure. It may be heated to approximately 110 to 120° C. and dried carbon dioxide gas passed through until the material is anhydrous. It may be dried in a vacuum drier, so as to yield an anhydrous material. It may be distilled in the presence of an insoluble solid, such as xylene, so that the xylene is permitted to carry off water during the distillation. Vapors, so obtained, are condensed and the water separated from the xylene. The xylene can be returned for re-circulation, so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl ester sulfonic acid, so obtained, is treated with one to three moles of ethylene oxide in the manner described in the aforementioned Hoeffelman Patent No. 2,208,581, so as to yield a water-insoluble ester.

HYDROXYLATED SULFONIC ACID ESTERS

Example 7

Dipentene is converted into the water-soluble sulfonic acid following the specific directions of the aforementioned Cromwell and Merley Patent No. 2,220,678. Such sulfonic acid is rendered anhydrous, and one pound mole of the anhydrous acid is treated with one to three pound moles of ethylene oxide, in the manner described in the aforementioned Hoeffelman Patent No. 2,208,581, so as to yield a water-insoluble ester.

HYDROXYLATED SULFONIC ACID ESTERS

Example 8

A crude distilled pine oil is sulfonated in the manner described in Example 5 of the aforementioned Cromwell and Merley patent. Such sulfonic acid is rendered anhydrous, and one pound mole of the anhydrous acid is treated with one to three pound moles of ethylene oxide, in the manner described in the aforementioned Hoeffelman Patent No. 2,208,581, so as to yield a water-insoluble ester.

HYDROXYLATED SULFONIC ACID ESTERS

Example 9

Commercial abietic acid or crude resin is sulfonated in the manner described in Example 6 of the aforementioned Cromwell and Merley patent. The sulfonic acid produced by said procedure is rendered anhydrous, and one pound mole of the anhydrous acid is treated with one to three pound moles of ethylene oxide, in the manner described in the aforementioned Hoeffelman Patent No. 2,208,581, so as to yield a water-insoluble ester.

HYDROXYLATED SULFONIC ACID ESTERS

Example 10

The same procedure is followed as in the preceding Examples 1 to 9, inclusive, except that four to six moles of ethylene oxide are employed instead of one to three moles.

HYDROXYLATED SULFONIC ACID ESTERS

Example 11

The same procedure is followed as in Examples 1 to 10, inclusive, except that propylene oxide or butylene oxide is substituted for ethylene oxide.

PHOSPHORATED COMPOUND

Example 1

Materials of the kind previously described under the heading: "Hydroxylated Sulfonic Acid Esters," Examples 1 to 11, inclusive, are treated with tetraphosphoric acid in an amount approximately equivalent to 200 percent. of the theoretical amount necessary to combine with the esterifiable hydroxyl group or groups present. Phosphoration is conducted at approximately 20 to 60° C. If solubility is not obtained, then, phosphorus pentoxide is added in small amounts to produce complete solubility. The amount of phosphorus pentoxide added usually varies from 25 to 150 percent. of the amount theoretically required to combine with the esterifiable hydroxyl group or groups originally present. A more reactive phosphorus compound may be used to complete phosphoration.

When phosphoration is complete, which is usually indicated by absolutely clear solubility of the phosphorated acid mass, it is generally washed immediately so as to remove the excess phosphoric acid or equivalent phosphorating agent. Washing is generally conducted with cold water, chilled brine, or ice. The phosphorated material is permitted to separate and the dilute draw-off acid is withdrawn. The acidic material may be employed as such, or neutralized in any convenient manner with any one of the conventional basic materials previously indicated. Ammonia is particularly desirable.

PHOSPHORATED COMPOUND

Example 2

The same procedure is employed as in Example 1, except that phosphoration is conducted by means of phosphorus oxychloride in the presence of anhydrous carbon tetrachloride in the manner described in detail in Example 1 of the aforementioned U. S. Patent No. 2,177,757, dated October 31, 1939 to Vanderbilt.

PHOSPHORATED COMPOUND

Example 3

The same procedure is followed as in Example 2 preceding, except that phosphorus trichloride is employed in the manner described in Example 4 of the aforementioned U. S. Patent No. 2,121,611, dated June 21, 1938, to Salsberg.

PHOSPHORATED COMPOUND

Example 4

The same procedure is followed as in the preceding examples, except that phosphoration is conducted primarily by means of phosphorus pentoxide in the manner described in U. S. Patent No. 2,026,785, dated January 7, 1936, to Harris.

PHOSPHORATED COMPOUND

Example 5

The same procedure is followed as in Examples 1 to 4, inclusive, except that an amine of the kind exemplified by monoamylamine, cyclohexylamine, or benzylamine is used as a neutralizing agent instead of ammonia.

It is to be noted that the last example illustrates a type in which the compounds obtained are water-insoluble. Such water-insoluble types are particularly adaptable for many purposes, and in fact, in many instances are just as desirable, or even more desirable for demulsification of certain crude oils than are the corresponding water-soluble types.

It is understood that in all the previous examples, as has been emphasized, the sulfonic acid employed is anhydrous, or substantially anhydrous. Any suitable method may be employed for drying the sulfonic acid, as, for example, a vacuum evaporator of the proper design; or the material may be mixed with a comparatively high boiling solvent, such as xylene, which can be distilled off in a manner to carry along the water, and subsequently permit the combined vapors of xylene and water to be condensed. The condensed xylene is returned to the distillation vessel and the water eliminated by a trap. This is a conventional procedure and requires no further description. In the phosphoration step it has been previously pointed out that a solvent may be employed, particularly if the material employed is substantially solid at the phosphoration temperature. A class of very suitable solvents includes the chlorinated alkanes, such as chloroform, carbon tetrachloride, trichlorethylene, dichlorpentane, etc. Incidentally, in some instances, particularly where glycidol is used for oxyalkylation, one may obtain an ester in which more than one acid sulfate radical may be introduced.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

In the hereto appended claims, the word "acyl" is used in reference to the radical $RSO_2$; i. e., one can conveniently consider the sulfonic acid $RSO_3H$ in terms of a formula indicating part of its structure, to wit, $R.SO_2.OH$.

In the hereto appended claims the words "polyhydric alcohol" are used in the conventional sense to include not only materials of the type exemplified by glycerol and ethylene glycol, but also materials of the kind in which the carbon atom chain is interrupted at least once by an oxygen atom, as, for example, diethylene glycol, diglycerol, etc.

It may be well to emphasize that the compounds of the kind herein contemplated may be manufactured by any suitable method; and it is not intended to limit the compounds to any particular method of manufacture. When manufactured by the use of an alkylene oxide, it is our preference to use ethylene oxide, propylene oxide, or butylene oxide.

It is to be noted that the phosphato sulfonates and the phosphato sulfonic acids referred to in the claims are surface-active in the same sense that sulfonic acids themselves are surface-active. Furthermore, it is to be noted that some sulfonic acids might be of the polysulfonic acid type, that is, as exemplified by derivatives of disulfonic acids. There is no objection to the use of such raw materials as reactants, and it is obvious that such procedure presents a means by which one obtains an ester in which either one or both terminal hydroxyl radicals may be sulfated.

Having thus described our invention, what we claim as new and desire to secure by Letters Patent is:

1. A process for breaking petroleum emulsions of the water-in-oil type, characterized by subjecting the emulsion to the action of a demulsifier comprising a water-soluble phosphato sulfonate, derived from a polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the radical:

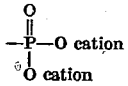

said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

2. A process for breaking petroleum emulsions of the water-in-oil type, characterized by subjecting the emulsion to the action of a demulsifier comprising a water-soluble phosphato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the radical:

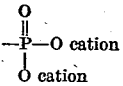

said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

3. A process for breaking petroleum emulsions of the water-in-oil type, characterized by subjecting the emulsion to the action of a demulsifier comprising a phosphato sulfonate, derived from a polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the radical:

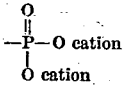

said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

4. A process for breaking emulsions of the water-in-oil type, characterized by subjecting the emulsion to the action of a demulsifier comprising a neutral water-soluble phosphato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the radical:

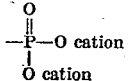

said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

5. A process for breaking petroleum emulsions of the water-in-oil type, characterized by subjecting the emulsion to the action of a demulsifier comprising a neutral water-soluble phosphato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the radical:

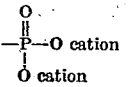

said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble; said cations being selected from the class consisting of sodium, potassium, and ammonium.

6. A process for breaking petroleum emulsions of the water-in-oil type, characterized by subjecting the emulsion to the action of a demulsifier comprising a compound of the kind described in claim 3, with the added proviso that the sulfonic acid must be of the mahogany acid type.

7. A process for breaking petroleum emulsions of the water-in-oil type, characterized by subjecting the emulsion to the action of a demulsifier comprising a compound of the kind described in claim 3, with the added proviso that the sulfonic acid must be of the green acid type.

8. A process for breaking petroleum emulsions of the water-in-oil type, characterized by subjecting the emulsion to the action of a demulsifier comprising a compound of the kind described in claim 3, with the added proviso that the sulfonic acid must be of the alkylated polycyclic aromatic type.

MELVIN DE GROOTE.
BERNHARD KEISER.